G. SOLIDAY.
STANCHION.
APPLICATION FILED NOV. 13, 1915.
1,212,701. Patented Jan. 16, 1917.
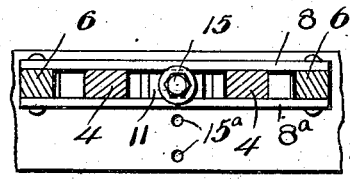
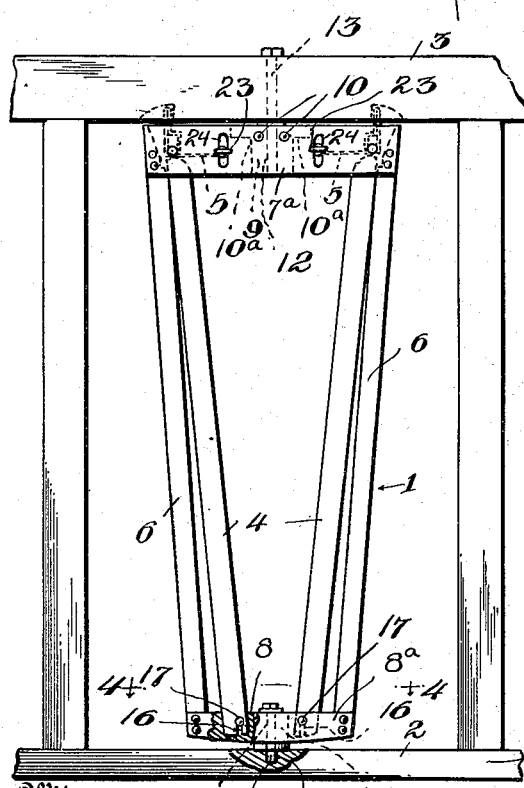
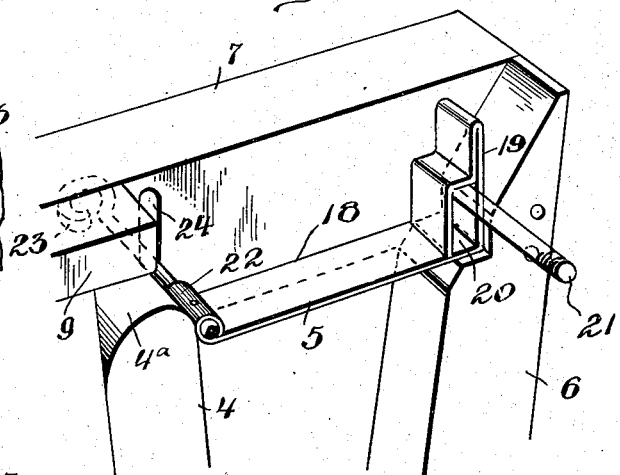
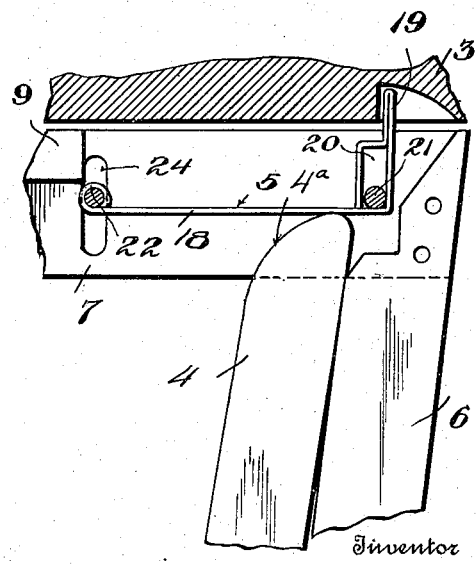
Inventor
George Soliday

UNITED STATES PATENT OFFICE.

GEORGE SOLIDAY, OF ORRVILLE, OHIO.

STANCHION.

1,212,701.   Specification of Letters Patent.   Patented Jan. 16, 1917.

Application filed November 13, 1915. Serial No. 61,287.

*To all whom it may concern:*

Be it known that I, GEORGE SOLIDAY, a citizen of the United States, residing at Orrville, in the county of Wayne and State of Ohio, have invented certain new and useful Improvements in Stanchions, of which the following is a specification.

The invention relates to improvements in stanchions of the type including a stanchion frame having stanchion bars swingably mounted therein, the stanchion frame being mounted to rotate between the floor and ceiling beams of a building; and the objects of the improvement are to provide combined means for locking the stanchion bars in holding or operative position while the frame is permitted to be rotated by the animal being held, and for locking the frame from rotation when the stanchion bars are in released or inoperative position; such means being simple in construction yet rigid and durable, and adapted to effectively perform the functions intended therefor.

The objects of the invention thus set forth in general terms may be attained by the construction and arrangement illustrated in the accompanying drawings forming part hereof in which—

Figure 1 is a fragmentary front elevation of a stanchion showing the stanchion bars in inoperative position and the stanchion frame locked from rotation; Fig. 2, a fragmentary perspective view of the stanchion frame with one of the upper cross pieces removed, showing the stanchion bar in operative position. Fig. 3, a front elevation section showing the stanchion bar and frame in inoperative position; and Fig. 4, a sectional view on line 4—4, Fig. 1 showing the manner of adjustably mounting the stanchion frame.

Similar numerals refer to similar parts throughout the drawings.

The stanchion comprises a frame 1 pivotally mounted between a floor beam 2 and an upper beam 3, and having a pair of stanchion bars 4 swingably mounted therein and a pair of freely movable locking members 5 for locking the stanchion bars in operative position and holding the stanchion frame from rotation when the stanchion bars are in inoperative position.

The stanchion frame 1 includes a pair of upright bars 6 slightly inclined outwardly from their lower ends and rigidly secured together at their opposite ends by means of the upper horizontal cross pieces 7 and 7$^a$ and the lower horizontal cross pieces 8 and 8$^a$, there being one cross piece on each side of the bars. The upper cross pieces 7 and 7$^a$ are provided midway between their ends with a pivot block 9 secured in position between the cross pieces as by means of bolts 10, and the lower cross pieces 8 and 8$^a$ are provided midway between their ends with a pivot block 11 also rigidly secured therebetween. The upper pivot block 9 is preferably cut away on each side thereof to form notches 10$^a$ for the upper ends of the stanchion bars and is provided with an aperture 12 therein adapted to receive the pivot pin 13 depending from the upper beam 3; and the lower pivot block 11 is provided with an aperture 14 adapted to receive a pivot pin 15 extending therethrough into an opening 15$^a$ in the floor beam 2.

The stanchion bars 4 are provided at their lower ends with the notches 16 forming a bearing on the inner side of their median line for the pivot pin 17, mounted in the lower cross pieces 8 and 8$^a$ of the stanchion preferably about midway between the pivot block 11 and side bars 6 thereof. The pivotal bearing for the bars being located near the inner edges thereof, the bars will tend to move outward when released from the locking member; and it will be evident that the notches forming the bearings for the stanchion bars will permit the bars to be readily removed from the frame when desired without loosening or removing any bolts, screws or the like.

The locking members 5 which are preferably made of metal, are L-shaped in form, and are movably mounted at their opposite ends between the upper cross pieces 7 and 7$^a$ and between the pivot block 9 and the upper ends of the upright bars 6 of the stanchion frame. Said members include a substantially horizontal portion 18 and the substantially upright portion 19 which is provided with an elongated slot 20 formed therein and adapted to receive a pivot bolt 21 extending through the upper cross pieces 7 and 7$^a$ at a point slightly above the upper end of the stanchion bar. The inner end of the horizontal portion 18 of the member is provided with a beaded end 22 having a handle 23 therein which extends through a slot 24 in the cross piece 7. The slot 24 extends slightly below the upper end of the stanchion bar 4 and upwardly sufficiently to permit the portion 18 of the locking member to be lifted up above the upper end of the bar; while the slot 20 formed in the upright portion 19 of the locking member is of a length sufficient to permit the upper end of the upright portion to normally lie substantially flush with the upper edges of the cross pieces 7 and 7$^a$.

It will be evident that when the stanchion bars are swung inward into the notches 10$^a$ of the pivot block 9, the inner end of the locking member will fall by gravity in front of the upper outer sides of the stanchion bars and thus form a stop for locking them in operative position. At the same time, the outer ends of the locking members will fall by gravity until the upper ends of the slots 18 engage with the pivot bolts 19, in which position the upper ends of the upright portions 17 are flush with or slightly below the upper edges of the cross pieces 7 and 7$^a$ and thus permit the frame to rotate on its pivot pins 13 and 15.

When it is desired to release the animal which is being held by the stanchion, the stanchion frame is swung into alinement with the upper beam 3 and floor beam 2, and the handles 23 of the locking member are raised, thus permitting the stanchion bars 4 to swing outwardly, in which movement the horizontal portions 16 of the locking member ride upon the upper ends of the bars, causing the upper ends of the upright portions 19 of the locking members to move upwardly into the notches or recesses 3$^a$ formed in the beam 3, to hold the frame in position ready for use. For the purpose of facilitating the swinging movements of the stanchion bars, the upper inner edges thereof may be beveled as at 4$^a$.

In order to accommodate the stanchion to the length of the animal which it is desired to lock therein, as shown in Fig. 4, the floor beam 2 may be provided with a series of openings 15$^a$ adapted to receive the pivot pin 15 in order to enable the frame to be adjusted forwardly and rearwardly.

I claim:

1. In combination with an upper beam having a recess therein, a stanchion including a frame mounted to rotate with reference to said beam and having a stanchion bar swingably mounted therein, and a member mounted at its opposite ends in the frame for movement into and out of engagement with the bar and recess for locking the bar in operative position and the frame from rotation when the bar is in inoperative position.

2. In combination with an upper beam having a pair of recesses therein, a stanchion including a frame mounted to rotate with reference to said beam and having a pair of stanchion bars swingably mounted therein, and a pair of locking members mounted at their opposite ends for movement into engagement with the bars and recesses for locking the bars in holding position and the frame from rotation, the frame being free to rotate when the bars are in operative position and locked when the bars are in inoperative position.

3. In combination with an upper beam having a recess therein, a stanchion including a frame mounted to rotate with reference to said beam and having a stanchion bar swingably mounted therein and an L-shaped locking member movably mounted at its opposite ends, one end of which is adapted to lock the stanchion bar in holding position and the other end of which is adapted to lock the frame in fixed position by engaging with the recess in the beam.

4. In combination with an upper beam having a recess therein, a stanchion including a frame mounted to rotate with reference to said beam and having a stanchion bar swingably mounted therein, and a locking member movably mounted at its opposite ends in the frame having a horizontal portion normally lying slightly below the upper end of the stanchion bar for locking it in operative position, and an upright portion at its outer end movable by the stanchion bar into engagement with the recess in the beam to lock the frame in fixed position as the stanchion bar swings into inoperative position.

5. In combination with an upper beam having recesses therein, a stanchion including a frame mounted to rotate with reference to said beam and having stanchion bars swingably mounted therein and a locking member for each of the bars and the frame movably mounted at its opposite ends in the frame and having a horizontal portion normally engaging at its inner end with the stanchion bar and an upright portion movable by the stanchion bars into engagement with the recesses in the beam for locking the frame from rotation as the stanchion bars swing into inoperative position, and a handle on the inner end of the locking member extending through the frame.

6. In combination with an upper beam having a pair of recesses therein, a stanchion including a frame mounted to rotate with reference to said beam and having a pair of stanchion bars swingably mounted therein, and a locking member for each of the bars and the frame including an L-shaped member having a horizontal portion and an upright portion, a pivot pin on the inner end of the horizontal portion movably mounted in the frame, and a pivot pin in the frame at the outer end of the horizontal portion extending through a slot in the upright portion, the horizontal portion normally engaging at its inner end with the stanchion bars and the upper end of the upright portion normally lying substantially flush with the upper edge of the frame, the locking member being movable by the stanchion bars into engagement with the recesses in the beam for locking the frame in fixed position.

GEORGE SOLIDAY.

Copies of this patent may be obtained for five cents each, by addressing the "Commissioner of Patents, Washington, D. C."